United States Patent
Park (10) Patent No.: US 6,620,050 B2
(45) Date of Patent: Sep. 16, 2003

(54) UNIVERSAL JOINT

(75) Inventor: Jung-Sik Park, Wonju-si (KR)

(73) Assignee: Mando Corporation, Kyunggi-Do (KR)

( * ) Notice: Subject to any disclaimer, the term of this patent is extended or adjusted under 35 U.S.C. 154(b) by 0 days.

(21) Appl. No.: 10/003,208

(22) Filed: Oct. 30, 2001

(65) Prior Publication Data

US 2003/0083136 A1 May 1, 2003

(51) Int. Cl.$^7$ ................................................. F16C 3/03
(52) U.S. Cl. ...................... 464/162; 464/180; 464/137; 403/109.1; 403/359.1
(58) Field of Search ................................ 464/112, 113, 464/114, 158, 159, 162, 180, 182, 185, 134, 137, 905; 403/57, 58, 74, 109.1, 359.1

(56) References Cited

U.S. PATENT DOCUMENTS

| | | | | |
|---|---|---|---|---|
| 2,560,958 A | * | 7/1951 | King | 464/83 |
| 3,757,601 A | * | 9/1973 | Burke | 74/492 |
| 4,103,514 A | * | 8/1978 | Grosse-Entrup | 464/167 |
| 4,667,530 A | * | 5/1987 | Mettler et al. | 74/493 |
| 5,647,683 A | * | 7/1997 | Easley | 403/359.6 |
| 5,709,605 A | * | 1/1998 | Riefe et al. | 464/83 |
| 6,368,225 B1 | * | 4/2002 | Breese et al. | 464/183 |
| 6,557,433 B1 | * | 5/2003 | Castellon | 74/492 |

* cited by examiner

Primary Examiner—Lynne H. Browne
Assistant Examiner—Kenneth Thompson
(74) Attorney, Agent, or Firm—R. Neil Sudol; Henry Coleman; William Sapone (57) ABSTRACT

The present invention relates to a universal joint which includes a slip joint in which a shaft is inserted into an interior of a hollow pipe for thereby implementing a rotation force transferring and slipping operation, a hollow yoke joint installed at both sides of the slip joint and having one side which surrounds the pipe and shaft, and an elastic means inserted between the pipe and shaft and both ends of the slip joint and the yoke joint for generating an elastic force in a radial direction.

5 Claims, 7 Drawing Sheets

PRIOR ART

PRIOR ART

UNIVERSAL JOINT

BACKGROUND OF THE INVENTION

1. Field of the Invention

The present invention relates to a universal joint, and in particular to an improved universal joint which is capable of providing an improved shaft connection for implementing a margin compensation, vibration decrease and a strength with respect to a temperature and rotational force between a pipe and shaft of a slip joint and between a slip joint and a yoke joint.

2. Description of the Background Art

Generally, a universal joint is installed at a slanted angle by a certain degree for thereby transferring a rotational force.

The universal joint is formed of a yoke joint installed at a side for transferring a rotational force and at a side for receiving the same, and a slip joint which slips in an axial direction between the yoke joint.

Figure 1:
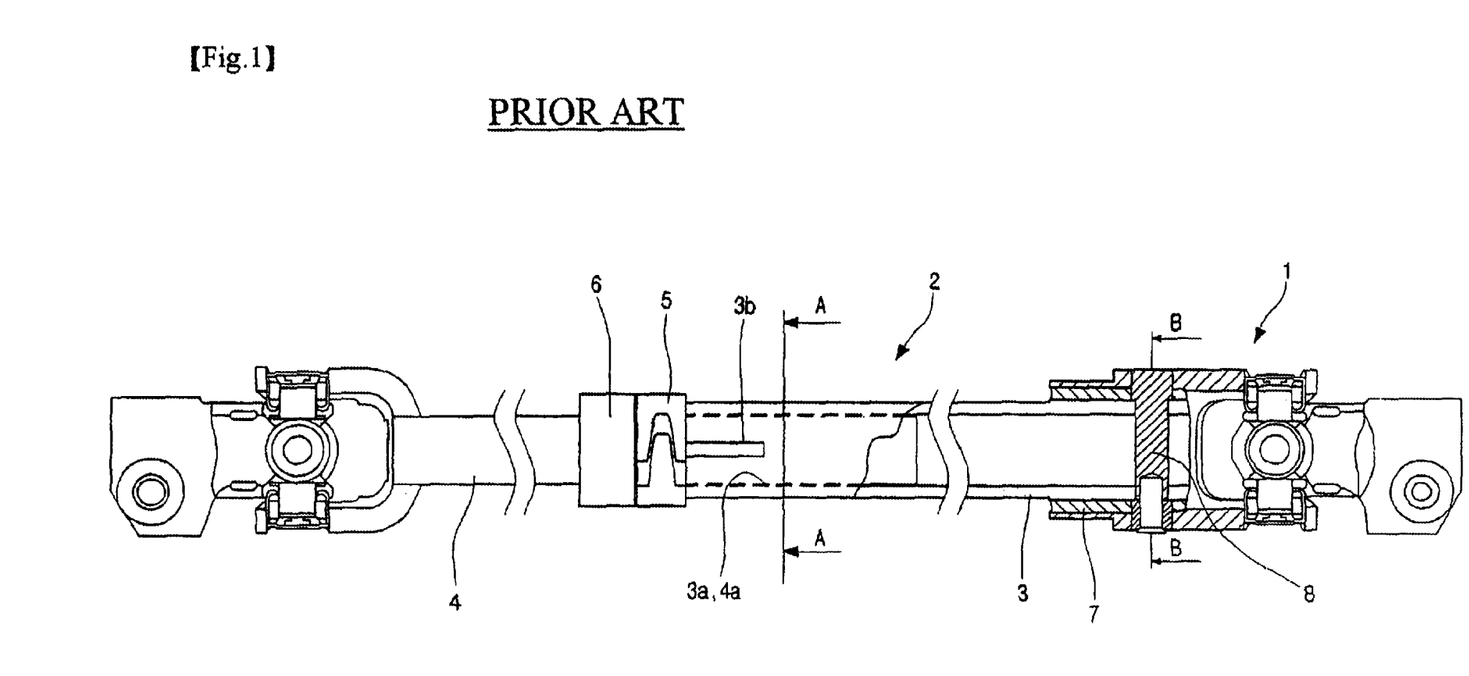
FIG. 1 is a cross-sectional view illustrating a conventional universal joint.

FIG. 1 is a view illustrating a conventional universal joint. As shown therein, the yoke joint 1 is arranged in such a manner that two yokes are alternately engaged for thereby installing a pin in a radial direction at one end of the same.

In addition, a cross shaped spider is installed therebetween for thereby transferring a rotational force from one side yoke to another side yoke in a state that the universal joint is slanted at a certain angle.

The slip joint 2 is constituted in such a manner that a rotational force transferred from one side yoke joint 1 to the other side yoke joint 1 and the slip joint 2 slips in an axial direction.

Namely, the slip joint 2 includes a pipe 3 connected with one side yoke joint 1 and a shaft 4 connected with the other side yoke joint 1.

Figure 2:
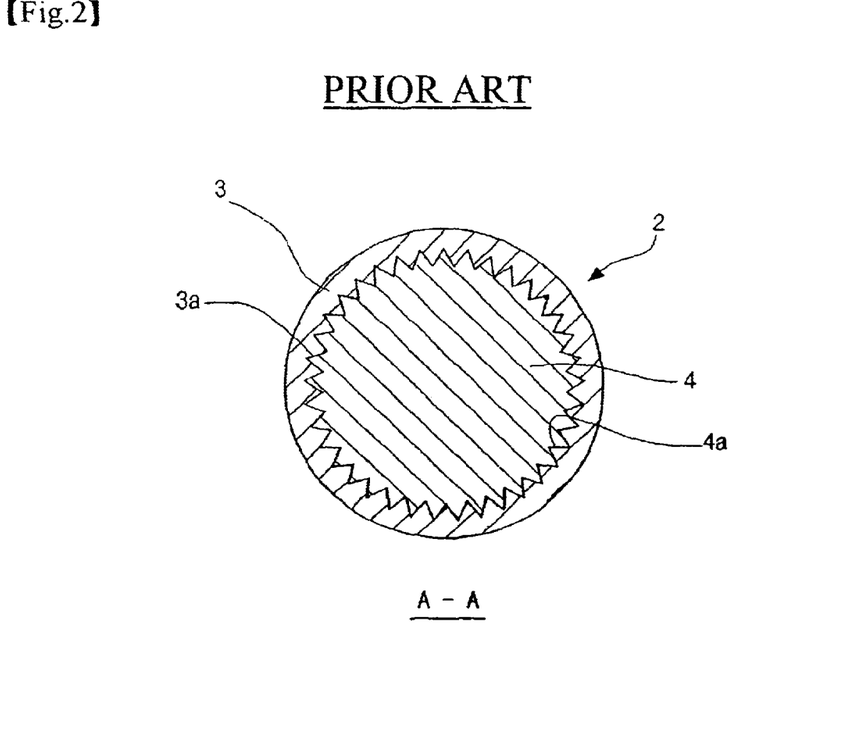
FIG. 2 is a cross-sectional view taken along line A—A of FIG. 1.

As shown in FIG. 2, a pair of engaged serrations(or splines) 3a and 3b are formed in the inner side of the pipe 3 and the outer side of the shaft 4.

In addition, a slip 3b is formed at an opened front end portion of the pipe 3 in an axial direction.

A dust cap 6 is installed at an opened front end portion of the pipe 3 for preventing a foreign substance from being inserted into the pipe 3.

A clip 5 is installed in an outer side of the slip 3b for preventing the pipe 3 and the shaft 4 from being loosened and limiting an axial movement of the pipe 3 and the shaft 4.

Therefore, the pipe 3 and the shaft 4 are closely fixed by the clip 5, and the radial direction marginal distance between the pipe 3 and the shaft 4 is minimized.

At this time, a weight of 8~15 kgf is applied in an axial direction of the pipe 3 and the shaft 4 in order to adjust the length of the slip joint 2. The above weight is not formed by a hand of a human.

Figure 3:
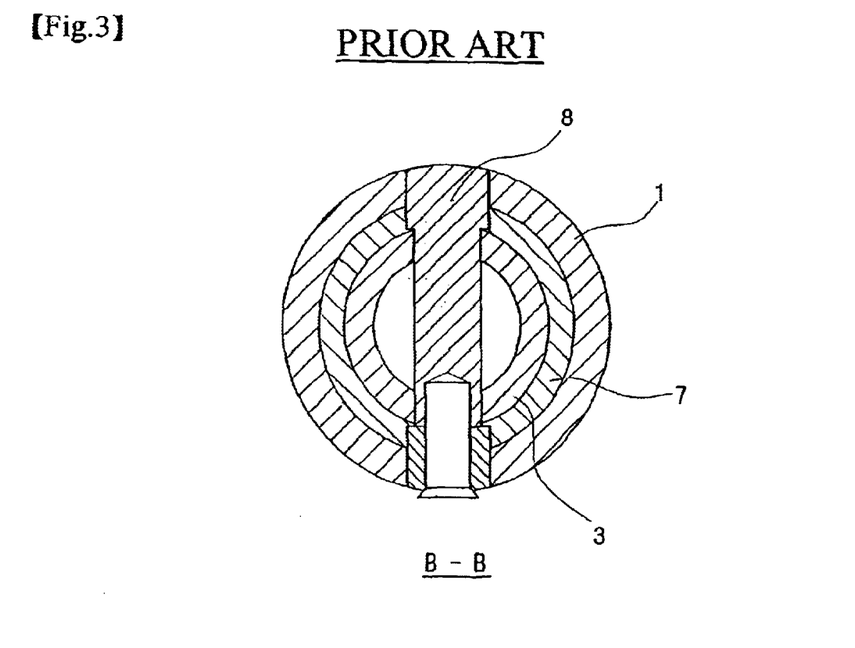
FIG. 3 is a cross-sectional view taken along line B—B of FIG. 1.

The slip joint 2 is installed into an interior of the yoke joint 1. As shown in FIG. 3, an anti-vibration rubber 7 is installed between the slip joint 2 and the yoke joint 1.

Namely, an anti-vibration rubber 7 formed of a rubber material having a good elastic force is installed between the inner portion of the yoke joint 1 and the outer portion of the slip joint 2 for thereby decreasing a vibration applied therebetween.

In addition, a hole is formed in the slip joint 2, the yoke joint 1 and the anti-vibration rubber 7, respectively, in a radial direction, so that the slip joint 2, the yoke joint 1 and the anti-vibration rubber communicate each other.

A pin-shaped stopper 8 is inserted into the interior of the hole for thereby stably supporting the slip joint 2, the yoke joint 1 and the anti-vibration rubber 7 in an axial direction and rotational direction.

In the case that a rotational angle occurs over an elastic region based on the material property of the anti-vibration rubber 7, the rotational force is transferred based on the strength of the stopper 8 installed through the slip joint 2 and the yoke joint 1.

However, in the conventional universal joint, since the slip joint, the pipe and the shaft are fixed using the clip, a slipping operation therebetween is not properly implemented.

In addition, since a lot noise and vibration occur due to a close contact of the elements when varying the length of the slip joint.

Since a serration is formed in the pipe and the shaft based on an accurate process, the fabrication process is complicated, and the fabrication cost is increased.

The anti-vibration rubber installed between the slip joint and the yoke joint may be degraded at a high and low temperature, and a crack may occur therein. In addition, the strength of the same is largely varied due to a high temperature.

Since the strength of the anti-vibration rubber is low for transferring the rotational force, a stopper is additionally needed.

SUMMARY OF THE INVENTION

Accordingly, it is an object of the present invention to provide a universal joint which overcomes the problems encountered in the conventional art.

It is another object of the present invention to provide a universal joint which is capable of implementing a margin compensation between a pipe of and shaft of a slip joint and between a slip joint and a yoke joint and a vibration decrease and enhancing a strength with respect to a temperature and rotational force by providing an elastic member which generates an elastic force in a radial direction and a transfer member which transfers a larger rotational force.

To achieve the above objects, there is provided a universal joint which includes a slip joint in which a shaft is inserted into an interior of a hollow pipe for thereby implementing a rotation force transferring and slipping operation, a hollow yoke joint installed at both sides of the slip joint and having one side which surrounds the pipe and shaft, and an elastic means inserted between the pipe and shaft and both ends of the slip joint and the yoke joint for generating an elastic force in a radial direction.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The embodiments of the present invention will be described with reference to the accompanying drawings.

Figure 4:
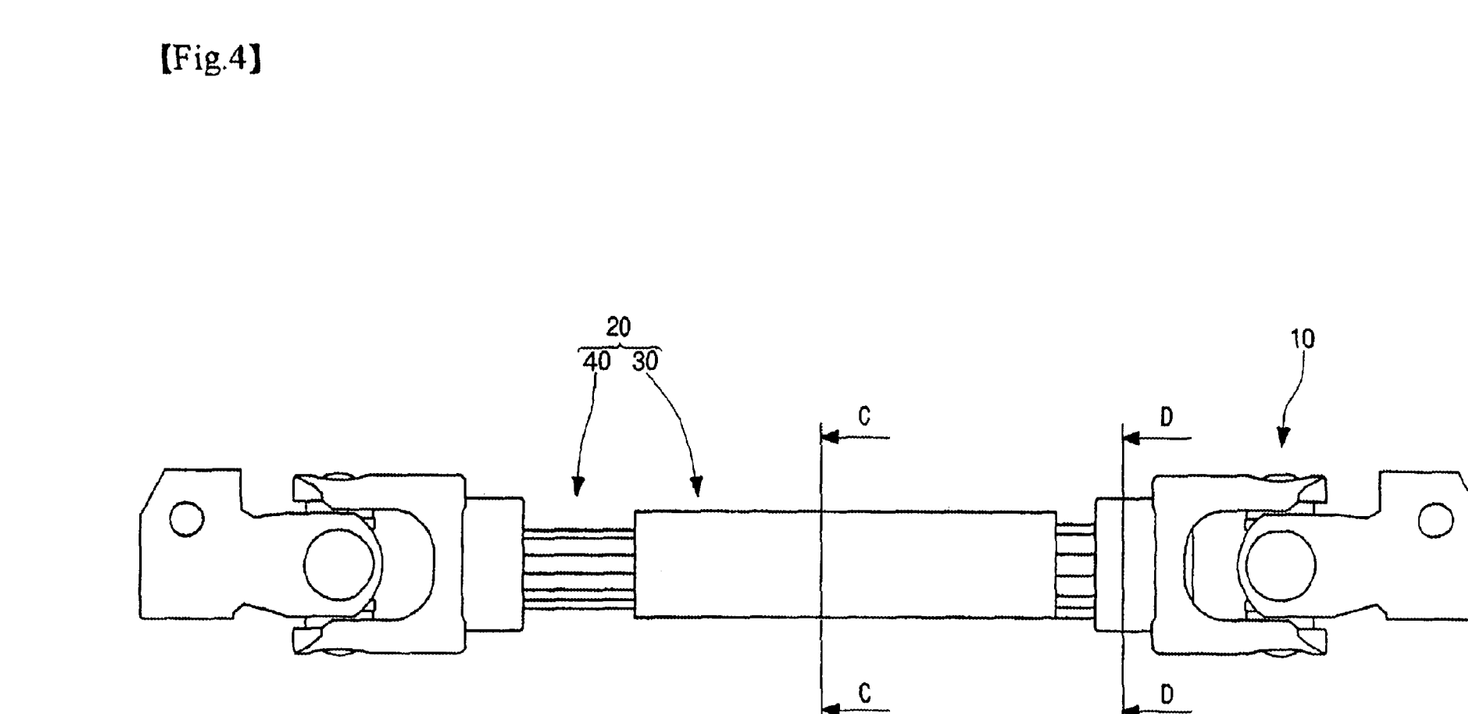
FIG. 4 is a cross-sectional view illustrating a universal joint according to the present invention.

FIG. 4 is a cross-sectional view illustrating a universal joint according to the present invention. As shown therein, the universal joint is formed of a longitudinal slip joint 20 and a yoke joint 10 installed at both ends of the slip joint 20.

The yoke joint 10 is formed of two yokes for transferring a rotational force in an angled state at below a certain angle.

The slip joint 20 installed between the yoke joint 10 transfers a rotational force and includes a pipe which transfers a rotational force and slips in an axial direction and a shaft 40 inserted therein.

Figure 5:
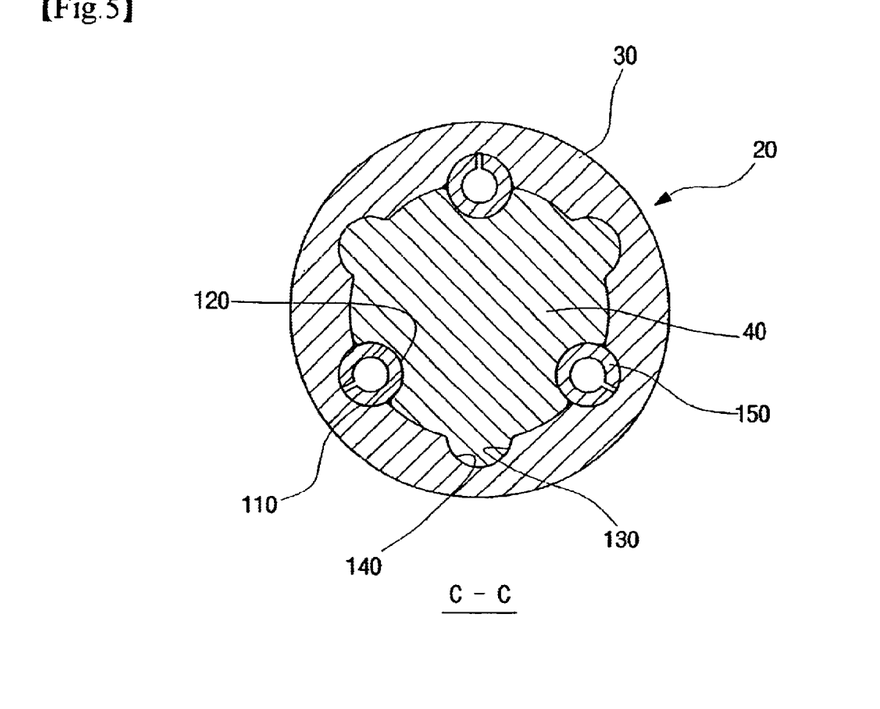
FIG. 5 is a cross-sectional view taken along line C—C of FIG. 4.
Figure 7:
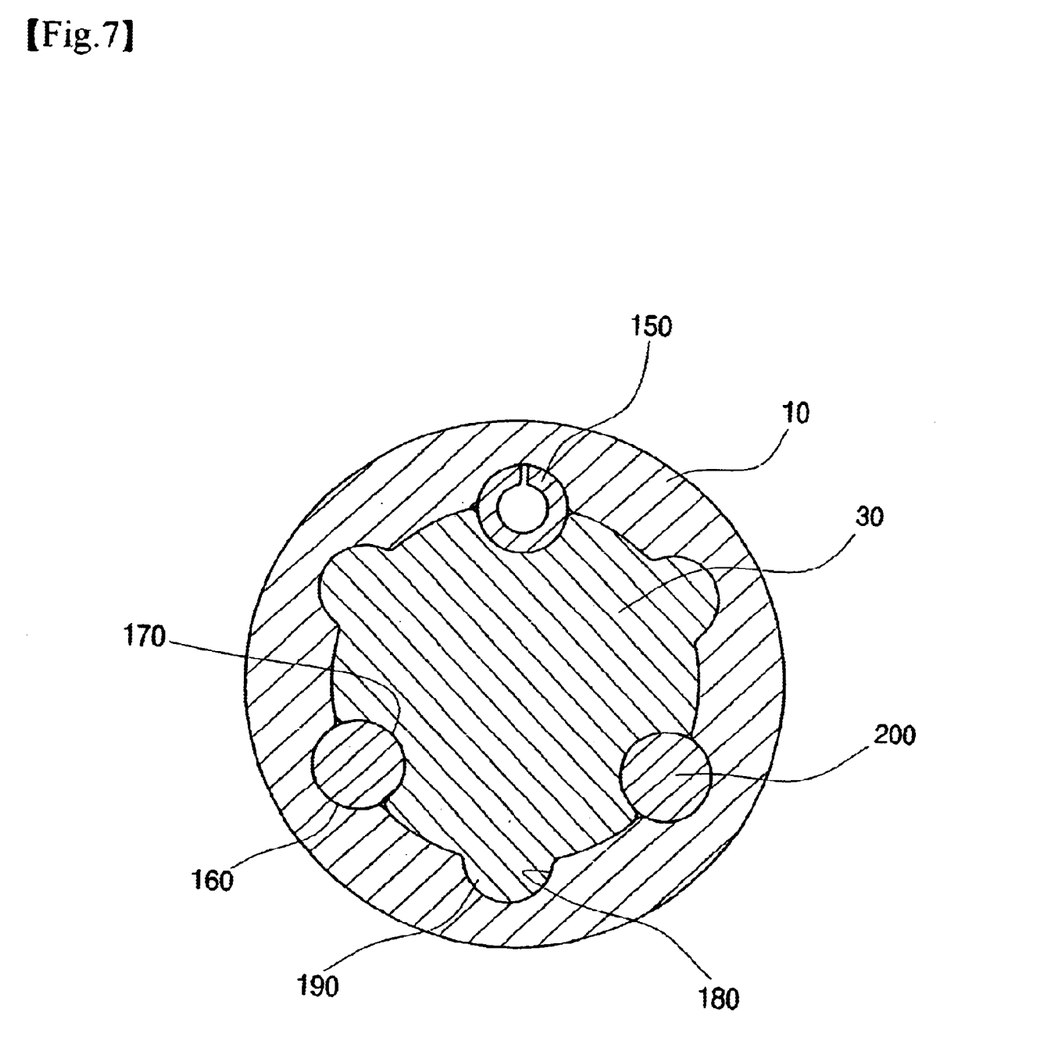
FIG. 7 is a disassembled perspective view illustrating a universal joint according to the present invention.

As shown in FIGS. 5 and 7, in the present invention, an elastic member and a transfer member are installed between the pipe 30 and the shaft 40 of the slip joint and the slip joint 20 and the yoke joint 10.

The elastic member installed between the pipe 30 and the shaft 40 of the slip joint 20 is formed of a hollow spring pin 150 having a cut-away side formed by rolling a metallic material in such a manner that it is extendable to the outside.

The spring pin 150 is installed in such a manner that the distance of spaced-apart both ends is decreased, so that the spring pin 150 is retracted in the direction of the center side. After the installation, an elastic force is generated from the outer side.

Namely, the spring pin 150 is closely installed between an inner surface of the pipe 30 and an outer surface of the shaft 40 for thereby transferring a rotational force therebetween. Three spring pins 150 are installed in each corresponding portions.

A transfer member installed between the pipe 30 and the shaft 40 of the slip joint 20 for transferring a rotational force is provided for transferring a larger rotational force.

In the transfer member, a pair of installation grooves 110 and 120 formed in a circular shape opposite to the inner surface of the pipe 30 and the outer surface of the shaft 40 for inserting the spring pin 150 thereinto are formed in three portions, respectively.

At this time, in an engaged state, the diameter of the installation grooves 110 and 120 closely contacts with the outer diameter of the spring pin 150 when the outer diameter of the spring pin 150 is decreased and assembled.

The transfer member includes an engaging protrusion 140 protruded from an outer surface of the shaft 40, and an engaging groove 130 formed in the interior of the pipe 30 for thereby receiving the engaging protrusion 140 thereinto.

Namely, three installation grooves 10 and the engaging protrusions 140 are installed in the outer portion of the shaft 40 at the same angle. The installation groove 110 and the engaging groove 130 are formed in the interior of the pipe 30 to correspond thereto.

At this time, the shapes of the installation grooves 110 and 120 and the engaging groove 130 are same, and the engaging protrusion 140 is protruded in the same shape as the spring pin 150. The engaging t protrusion 140 and the spring pin 150 are selectively inserted into the installation grooves 110 and 120 and the engaging groove 130.

Figure 6:
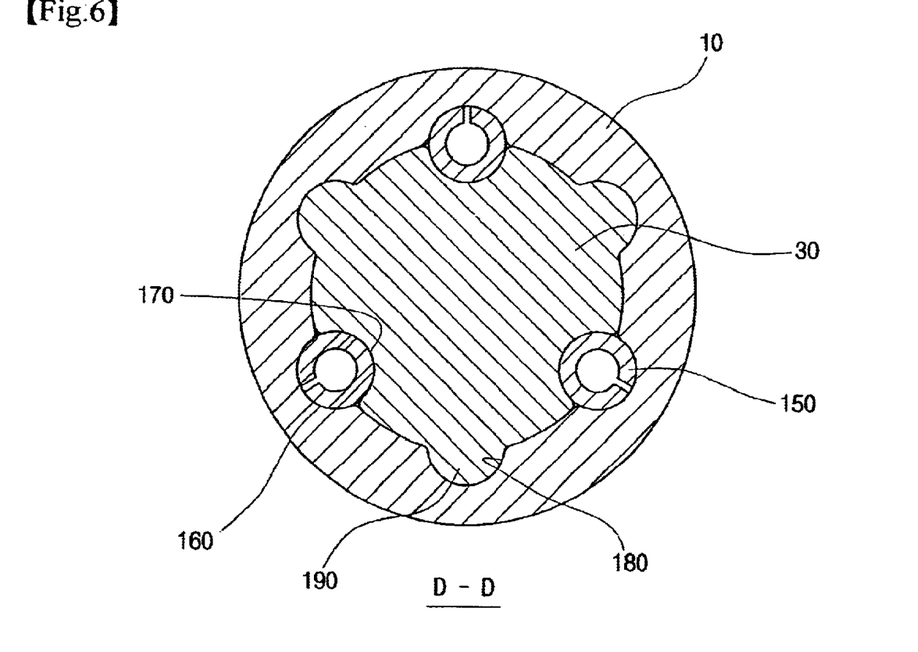
FIG. 6 is a cross-sectional view taken along line D—D of FIG. 4.

As shown in FIGS. 6 and 7, the elastic member and the transfer member are implemented between the slip joint 20 and the yoke joint 10 in the similar manner.

At this time, since the shaft 40 of the slip joint 20 is connected with the yoke joint 10 in the same manner as the connection with the pipe 30, in the present invention, the connection of the pipe 30 and the yoke joint 10 will be described.

The elastic member between the slip joint 20 and the yoke joint is implemented based on the spring pin 150 which are installed in corresponding portions by three.

In addition, the transfer member between the slip joint 20 and the yoke joint 10 is implemented based on a pair of the installation grooves 160 and 170 which are formed in three portions in the outer surface of the pipe 30 and the inner surface of the yoke joint 10 to be opposite each other, so that the spring pins 150 are inserted thereinto.

The transfer member between the slip joint 20 and the yoke joint 10 is formed of an engaging protrusion 190 protruded on the outer surface of the pipe 30 and an engaging groove 180 formed in the interior of the yoke joint 10, so that the engaging protrusion 190 is inserted thereinto.

Three installation grooves 170 and engaging protrusions 190 are formed in the outer portion of the pipe 30 at the same angle, respectively, and the installation groove 160 and the engaging groove 180 are formed in the interior of the yoke joint to correspond with the same.

Figure 8:
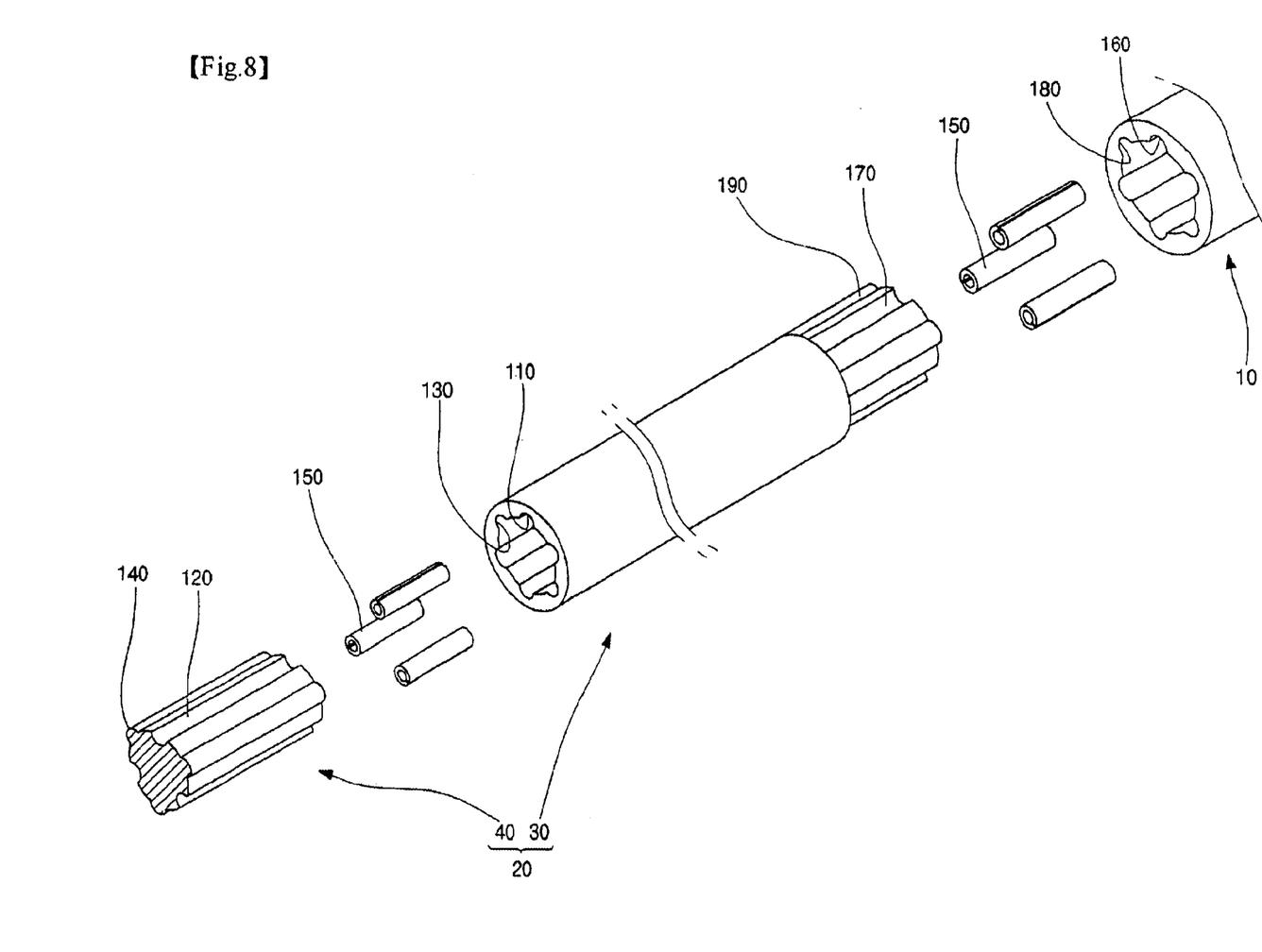
FIG. 8 is a cross-sectional view illustrating another embodiment of the present invention.

As shown in FIG. 8, one spring pin 150 is inserted into the interior of the installation grooves 110, 120, 160 and 170, respectively, and a metallic fixing pin 200 is inserted into the remaining grooves.

In this case, since the elastic force is decreased but a larger rotational force is obtained, the numbers of the spring pin 150 and the fixing pins 200 may be adjusted.

Figure 9:
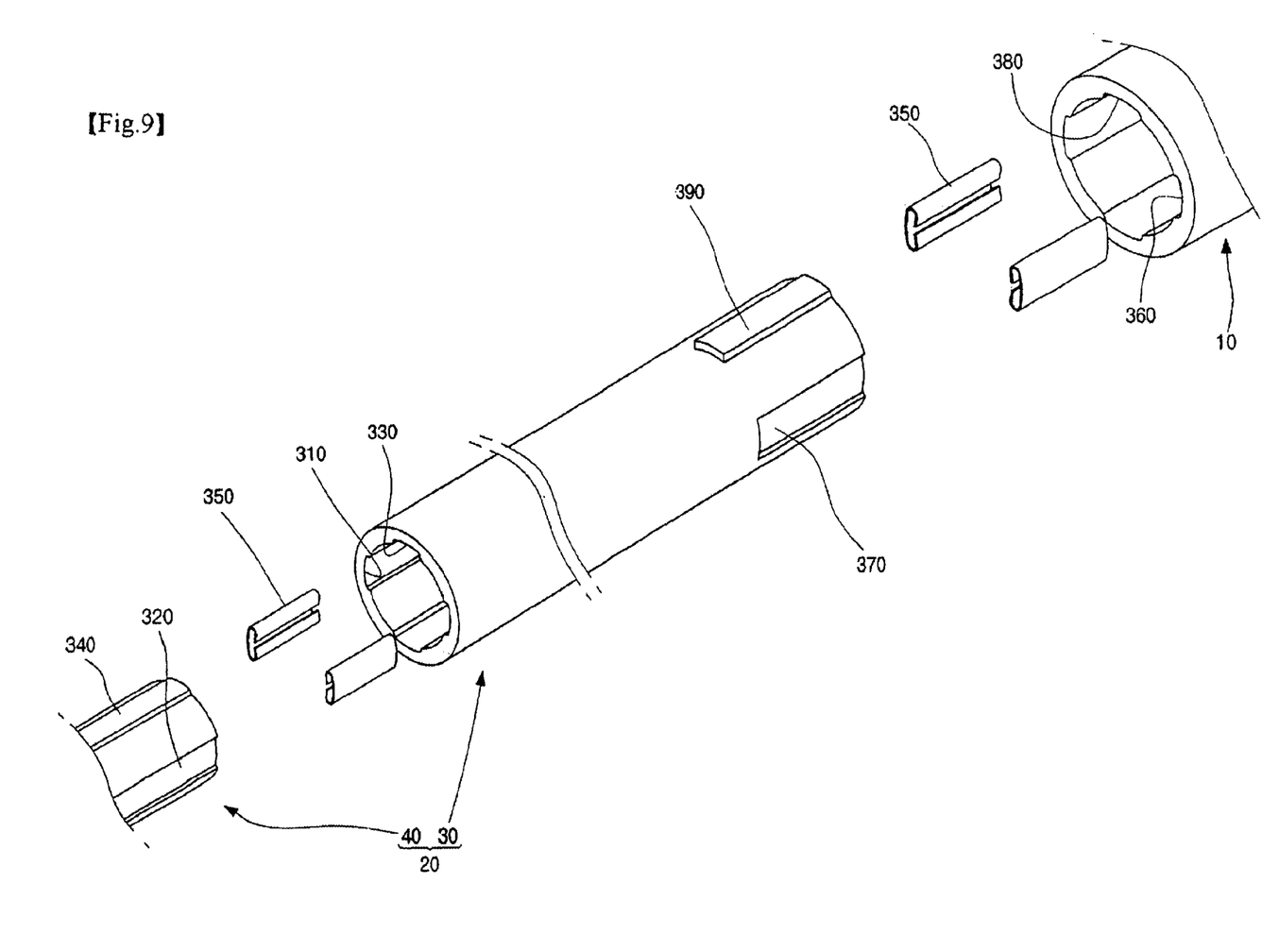
FIG. 9 is a disassembled perspective view illustrating still another embodiment of the present invention.

FIG. 9 is a disassembled perspective view illustrating another embodiment of the present invention. As shown therein, since the elements except for the elastic member and the transfer member are the same as the earlier embodiment of the present invention, the same element names and same reference numerals are used for the same elements.

First, an elastic member installed between the pipe 30 and shaft 40 of the slip joint is formed of spring pins 350 which are opposite each other and are distanced from each other.

The spring pin 350 is hollow and is formed in such a manner that a metal material is rolled in a pipe shape and an outer part of the same is cut-away, and a cross section in a radial direction is elongated and is tightly contacted between the pipe 30 and the shaft 40.

Namely, the spring pin 350 includes a flat cross section formed in a radial direction so that the spring pin 350 does not roll and is installed in a compressed state in the direction of a center portion in such a manner that the distance of outer portions is decreased.

The transfer member between the pipe 30 and the shaft 40 of the slip joint 20 is engaged in a certain direction so that the pipe 30 and the shaft 40 are more tightly engaged in the rotation direction and includes a pair of the opposite installation grooves 310 and 320 in the outer surface of the shaft 40 and the inner surface of the pipe 30, respectively.

Namely, the installation grooves 310 and 320 are concaved in a shape that a half of the elongated hole is divided to correspond with an outer shape of the spring pin 350. When the installation grooves 310 and 320 become opposite, the spring pin 350 is installed in a compressed state.

The transfer member installed between the pipe 30 and the shaft 40 of the slip joint 20 includes an engaging protrusion 340 protruded from an outer surface of the shaft 40 and an engaging groove 330 concaved in an outer side in the inner portion of the pipe 30.

Two engaging protrusions 340 are formed in the outer portion of the shaft 40 in a direction crossed with respect to two installation grooves 320. The installation groove and engaging groove 330 are formed in the inner portion of the pipe 30.

At this time, the shapes of the installation grooves 310 and 320 and the engaging groove 330 are same, and the engaging protrusion 340 has a shape similar with the outer shape of the spring pin 350 for a selective insertion into the installation grooves 310 and 320 and the engaging groove 330.

The elastic member and transfer member are adapted between the slip joint 20 and the yoke joint 10 in a similar manner.

At this time, the shaft 40 of the slip joint 20 is connected with the yoke joint in the same manner as the connection with the pipe 30. Therefore, in the present invention, the connection of the pipe 30 and the yoke joint 10 will be described.

First, an elastic member installed between the slip joint 20 and the yoke joint 10 is installed at both opposite sides and includes a spring pin 350 having an elongated cross section in a radial direction.

A transfer member between the slip joint 20 and the yoke joint 10 includes a pair of installation grooves 360 and 370 having elongated opposite cross sections in an outer surface of the shaft 40 and an inner surface of the pipe 30 in such a manner that the spring pin 350 is inserted.

A transfer member installed between the slip joint 20 and the yoke joint 10 includes an engaging protrusion 390 protruded from an outer surface of the pipe 30 and an engaging grove 380 concaved in an inner portion of the yoke joint 10 to correspond with the engaging protrusion 390.

Namely, two engaging protrusions 390 are formed in an outer portion of the pipe 30 in a direction crossed with two installation grooves 370. An installation groove 360 and an engaging groove 380 are formed in the inner potion of the yoke joint 10 to correspond with the engaging protrusions 390.

At this time, the installation grooves 360 and 370 and the engaging groove 380 have the same shapes, and the engaging protrusion 390 has a shape similar with the outer shape of the spring pin 350 so that the engaging protrusion 390 is selectively inserted into the installation grooves 360 and 370 and the engaging groove 380.

In the above-described universal joint according to the present invention, the engaging protrusions 140, 190 and 340, 390 of the engaging grooves 130, 180 and 330, 380 are inserted in an axial direction, and the shaft 40 and pipe 30 of the slip joint 20 and the slip joint 20 and the yoke joint 10 are fixed in the rotation direction.

At this time, since the engaging protrusions 140, 190 and 340, 390 are selectively installed into the engaging grooves 130, 180 and 330, 380 and the installation grooves 110, 120, 160, 170 and 310, 320, 360, 370, the engaging grooves 130, 180 and 330, 380 and the installation grooves 110, 120, 160, 170 and 310, 320, 360, 370 into which the engaging protrusions 140,190 and 340, 390 are not inserted have certain spaces so that the spring pins 150 and 350 are inserted into the opposite installation grooves 110, 120, 160, 170 and 310, 320, 360, 370.

In state that the shaft 40 and pipe 30 of the slip joint 20 and the slip joint 20 and the yoke joint 10 are temporarily fixed in the rotation direction, the spring pins 150 and 350 are retracted and inserted into the opposite engaging grooves 130, 180 and 330, 380 through the installation groves 110, 120, 160, 170 and 310, 320, 360, 370 and the opposite installation grooves 110, 120, 160, 170 and 310, 320, 360, 370 in the radial direction.

Therefore, the spring pins 150 and 350 generate an elastic force in an outer direction and is closely contacted between the shaft 40 and pipe 30 of the slip joint 20 and the slip joint 20 and the yoke joint 10 and are fixed in the rotation direction and axial direction, respectively. In addition, in the present invention, it is possible to decrease the vibration which occurs between the haft 40 and the pipe 30 of the slip joint 20 and the slip joint 20 and the yoke joint 10.

As described above, the universal joint according to the present invention includes an elastic member formed of a spring pin and a pin between the pipe and shaft of the slip joint and between the slip joint and the yoke joint, and a transfer member formed of an installation groove, an engaging protrusion and an engaging grove.

Therefore, in the present invention, the slipping operation of the slip joint is easily implemented by the spring pin and pin between the pipe and shaft, and when the length of the slip joint is varied, the noise and vibration are decreased, and a reliability of the product is enhanced.

In addition, the transfer structure of the rotation force is simplified, and the fabrication and assembling processes of the slip joint and yoke joint are simplified. Therefore, in the present invention, it is possible to decrease the fabrication cost.

Furthermore, the margin in the rotation direction is compensated between the pipe and shaft of the slip joint and the slip joint and yoke joint. In addition, a noise due to a margin therebetween is decreased, and an efficient rotation force transferring operation implemented.

In the present invention, since a spring pin is formed of a metallic material between the slip joint and the yoke joint, the strengths against a high and low temperature and for transferring a rotational force are enhanced.

Since the engaging groove and engaging protrusion are integrally formed in the inner and outer sides of the slip joint and yoke joint, an additional part and an additional process may be removed for assembling the slip joint and the yoke joint.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a universal joint comprising a slip joint in which a shaft is inserted into an interior of a hollow pipe for thereby implementing a rotation force transferring and slipping operation; a hollow yoke joint installed at both ends of the slip joint and having one side or portion which surrounds the pipe and shaft; an elastic means inserted between the pipe and shaft and between each end of the slip joint and the yoke joint for generating an elastic force in a radial direction; and transfer means installed between the pipe and shaft and between each end of the slip joint and the yoke joint, said transfer means being integrally formed with the pipe and shaft and the slip joint and the yoke joint for thereby enhancing a rotational and transferring force, the improvement wherein said transfer means is formed of engaging protrusions protruded from an end of the shaft inserted into the interior of the pipe and from an outer end of the pipe inserted into the interior of the yoke joint, and concave engaging grooves provided in an inner portion of the pipe and an inner portion of the yoke joint to correspond with the engaging protrusions.

2. In a universal joint comprising a slip joint in which a shaft is inserted into an interior of a hollow pipe for thereby implementing a rotation force transferring and slipping operation; a hollow yoke joint installed at both ends of the slip joint and having one side or portion which surrounds the pipe and shaft; an elastic means inserted between the pipe and shaft and between each end of the slip joint and the yoke joint for generating an elastic force in a radial direction, wherein said elastic means is formed of a spring pin in which a hollow outer portion is cut-away in an axial direction and is compressed in a direction of a center portion for thereby generating an elastic force in an outer direction, the improvement wherein said spring pin is elongated in a circumferential direction so that the spring pin does not roll, said spring pin being inserted in an installation groove in at least one of said pipe and said shaft, and wherein the depth of said installation groove is half of the thickness of the spring pin in a radial direction.

3. In a universal joint comprising a slip joint in which a shaft is inserted into an interior of a hollow pipe for thereby implementing a rotation force transferring and slipping operation; a hollow yoke joint installed at both ends of the slip joint and having one side or portion which surrounds the pipe and shaft; an elastic means inserted between the pipe and shaft and between each end of the slip joint and the yoke joint for generating an elastic force in a radial direction; and transfer means installed between the pipe and shaft and between each end of the slip joint and the yoke joint, said transfer means being integrally formed with the pipe and shaft and the slip joint and the yoke joint for thereby enhancing a rotational and transferring force, wherein said transfer means is formed of installation grooves provided in an inner portion of the pipe and an outer portion of the shaft and an inner portion of the yoke joint and an outer portion of the pipe, respectively, which are opposite to each other in a radial direction so that a spring pin inserted in said installation grooves is retracted and inserted, the improvement wherein said spring pin is elongated in a circumferential direction so that the spring pin does not roll, and the depth of said installation groove is half of the thickness of the spring pin in a radial direction.

4. In a universal joint comprising a slip joint in which a shaft is inserted into an interior of a hollow pipe for thereby implementing a rotation force transferring and slipping operation; a hollow yoke joint installed at both ends of the slip joint and having one side or portion which surrounds the pipe and shaft; an elastic means inserted between the pipe and shaft and between each end of the slip joint and the yoke joint for generating an elastic force in a radial direction; and transfer means installed between the pipe and shaft and between each end of the slip joint and the yoke joint, said transfer means being integrally formed with the pipe and shaft and the slip joint and the yoke joint for thereby enhancing a rotational and transferring force, wherein said transfer means is formed of installation grooves formed in an inner portion of the pipe and an outer portion of the shaft and an inner portion of the yoke joint and an outer portion of the pipe, respectively, which are opposite to each other in a radial direction so that a spring pin inserted in said installation grooves is retracted and inserted, said transfer means being additionally formed of engaging protrusions protruded from an end of the shaft inserted into the interior of the pipe and from an outer end of the pipe inserted into the interior of the yoke joint, and concave engaging grooves provided in an inner portion of the pipe and an inner portion of the yoke joint to correspond with the engaging protrusions, the improvement wherein the inner diameters of the installation grooves and engaging grooves are alternately formed in the portions symmetrical in the same shape, and the outer diameters of the spring pin and engaging protrusions are formed in the same shape, and the spring pin and engaging protrusions are selectively inserted into the interiors of the installation grooves and the engaging grooves.

5. The joint of claim 1, wherein the inner diameters of the installation groove and engaging groove are alternately formed in the portions symmetrical in the same shape, and the outer diameters of the spring pin and engaging protrusions are formed in the same shape, and the spring pin and engaging protrusions are selectively inserted into the interiors of the installation groove and the engaging groove.

* * * * *